(12) United States Patent
Petak

(10) Patent No.: US 7,935,887 B2
(45) Date of Patent: May 3, 2011

(54) DEVICE COVER AND CUTTING GUIDE AND METHOD FOR USE

(75) Inventor: Randy Petak, Pico Rivera, CA (US)

(73) Assignee: P-W Industries, Inc., Pico Rivera, CA (US)

( * ) Notice: Subject to any disclaimer, the term of this patent is extended or adjusted under 35 U.S.C. 154(b) by 583 days.

(21) Appl. No.: 11/969,706

(22) Filed: Jan. 4, 2008

(65) Prior Publication Data

US 2009/0173513 A1 Jul. 9, 2009

(51) Int. Cl.
*H02G 3/14* (2006.01)

(52) U.S. Cl. ............ 174/66; 174/67; 220/241; 220/242; 33/528; 33/DIG. 10

(58) Field of Classification Search .............. 174/66, 174/67, 53, 58, 57, 480, 481, 50; 220/3.2–3.9, 220/242, 241; 33/562, 528, DIG. 10; D13/173, D13/156
See application file for complete search history.

(56) References Cited

U.S. PATENT DOCUMENTS

| | | | | |
|---|---|---|---|---|
| 1,956,196 A | * | 4/1934 | Korab | 220/3.8 |
| 4,979,633 A | * | 12/1990 | Lakey | 220/3.8 |
| 5,301,437 A | * | 4/1994 | Burke | 33/528 |
| 5,526,952 A | * | 6/1996 | Green | 220/3.8 |
| 5,639,991 A | * | 6/1997 | Schuette | 174/58 |
| 6,403,883 B1 | * | 6/2002 | Morgan et al. | 174/58 |
| 6,462,278 B1 | * | 10/2002 | Vrame | 174/67 |
| 6,538,202 B1 | * | 3/2003 | Shaffer et al. | 174/66 |
| 6,867,369 B2 | * | 3/2005 | Wiggins | 174/58 |
| 6,906,260 B2 | * | 6/2005 | Grendahl | 174/66 |
| 6,949,708 B1 | * | 9/2005 | Hausen et al. | 174/66 |
| 7,022,915 B1 | * | 4/2006 | Galguera | 174/66 |
| 7,075,008 B2 | * | 7/2006 | Smith | 174/66 |
| 7,456,359 B1 | * | 11/2008 | Tidd | 174/66 |
| 7,608,781 B2 | * | 10/2009 | Compagnone, Jr. | 174/58 |
| 7,622,675 B2 | * | 11/2009 | Sutter | 174/66 |

\* cited by examiner

*Primary Examiner* — Angel R Estrada
(74) *Attorney, Agent, or Firm* — Christie, Parker & Hale, LLP

(57) ABSTRACT

An electrical device outlet cover for use in covering an opening in an outlet box or an opening in an outlet box drywall ring. It includes a front plate having a cut line formed through a first, telescopable portion of the front plate, the cut line allowing the first, telescopable portion of the front plate to be telescoped outwardly from a second, stationary portion of the front plate. Also provided is a cutting guide with a wall that extends generally perpendicularly upwardly from the front plate and follows a path that generally corresponds to a shape of an outlet box or a drywall ring to which the device outlet cover is to be attached. The invention also provides a method for protecting an electrical device in an electrical device outlet during installation of sheet material and providing for accruing cutting of an opening in the sheet material.

20 Claims, 16 Drawing Sheets

DEVICE COVER AND CUTTING GUIDE AND METHOD FOR USE

BACKGROUND

A cover and cutting guide for outlet boxes, and more particularly a cover for outlet boxes containing an electrical device, the cover and cutting guide being provided to protect the electrical device and its wiring during installation of wall covering and wall finishing operations, after which an opening in the wall sheet material can be made in situ to expose the outlet boxes and permit easy remove of the cover and cutting guide after completion.

In commercial construction applications, pre-fabrication of various systems can be useful to lower labor costs, increase productivity, and speed up the construction process. Accordingly, pre-wired electrical systems, wherein wiring, plugs, switches and other devices are pre-wired into outlet boxes, are gaining popularity. These pre-wired outlet boxes and their associated conduits and wiring are installed within the walls, ceilings, floors and other parts of structures. After the conduit and outlet boxes are installed, the studs and joists are normally covered with wall, floor or ceiling covering materials such as drywall, fiber board, plywood, masonry board, lath and plaster, composite sheet material, and other materials. In the application of the sheet material, installers frequently use a router with a small cutting tip to expose openings for outlets by loosely hanging the sheet material in place, punching the router through the sheet material in the general vicinity of the outlet box, and then routing around the outer perimeter of the outlet box to define an opening in the sheet material. In such a way, the sheet material can be loosely installed through a few points to the studs (e.g. with screws), and then the cutouts for the outlet box can be formed in the sheet material with a router, and thereafter, the sheet material can be completely mounted.

A shortcoming of using a router is that if the outlet box is pre-wired and includes switches, electrical outlets and other devices, sometimes the router can cause damage to the switch and/or the wiring contained therein, thereby requiring removal of the sheet material and replacement of the pre-wired outlet box. Also, because the walls of the outlet box are typically used as a guide for the router tip, misalignment and hole oversizing mistakes frequently occurs. Not only is this unsightly, but since building codes are stringent about the presence of oversized gaps between outlet boxes and the wall covering material, these gaps must be repaired.

It is known to use plastic covers to protect switches and outlets from being painted over during painting and other wall treatment, and there are covers which are used to mark the inside surface of the sheet material during installation of the sheet material. There are also rigid covers that are adapted to protect the electrical devices from the jolting impact of a router blade, but these prior rigid covers are not typically adapted to work with a variety different electrical devices (e.g., switches and outlets) in an electrical outlet box, nor do they provide an easy to use and precise cutting guide. Accordingly, there remains a need for outlet covers and cutting guides that are adapted to permit use of routers to cut out openings in sheet material during installation of sheet material over pre-wired outlet boxes.

SUMMARY OF THE INVENTION

The invention provides an outlet box cover and a cutting guide. The outlet box cover has a face plate portion which generally covers an open face of an outlet box and/or a drywall ring affixed thereto. In order to permit the outlet box cover of a particular size (such as for single gang outlet boxes with a drywall ring attached thereto, a double gang box with a drywall ring attached to the open front thereof, an octagonal box, etc.) to be used to cover various electrical devices that could be contained therein, a cutout pattern is formed on the front wall portion of the cover. The cutout patterns permits portions of the front wall portion to be pushed outwardly, e.g., to accommodate a protruding switch handle. Such cutout pattern will result in area(s) of the front wall portions being moveable with respect to the electrical device, and will therefore all the cover to conform to a variety of shaped electrical devices, including devices with protrusions, such as switches. One or more pairs of arms extend from edges of the front wall portion and the arms are optionally adapted to engage with either the drywall ring and/or side walls of the outlet box. Alternately, other means can be used to retain the outlet box cover in position, such as screws, adhesive, clips, or other mechanical or other means. The outlet box cover is preferably formed of material (e.g. steel, strong plastic, etc.) which cannot be easily penetrated or damaged by a router or other cutting tools, thereby protecting switches, outlets, jacks and wiring contained in a pre-wired outlet box. However, as noted above, the cutout lines will allow movement of the front wall and portions thereof relative to devices located in the outlet box or attached to the drywall ring. The cutting guide is either permanently or detachably fixed to the outlet box cover. However, it is also possible to attach the cutting guide directly to the outlet box or a drywall ring attached thereto in situations where the outlet box is or is not pre-wired with an electrical or other device, e.g., to prevent materials from entering the outlet box. The cover and/or cutting guide can preferably be provided to the end user already attached to the pre-wired outlet boxes, or can be installed thereafter. After the sheet material is installed, the cover or cover and cutting guide can be easily removed and either discarded, re-used, or recycled. Apertures or other features can be formed in the outlet box cover to allow the outlet cover to be easily removed (e.g., with needle-nose pliers, and the like).

DETAILED DESCRIPTION OF THE INVENTION

Figure 1:
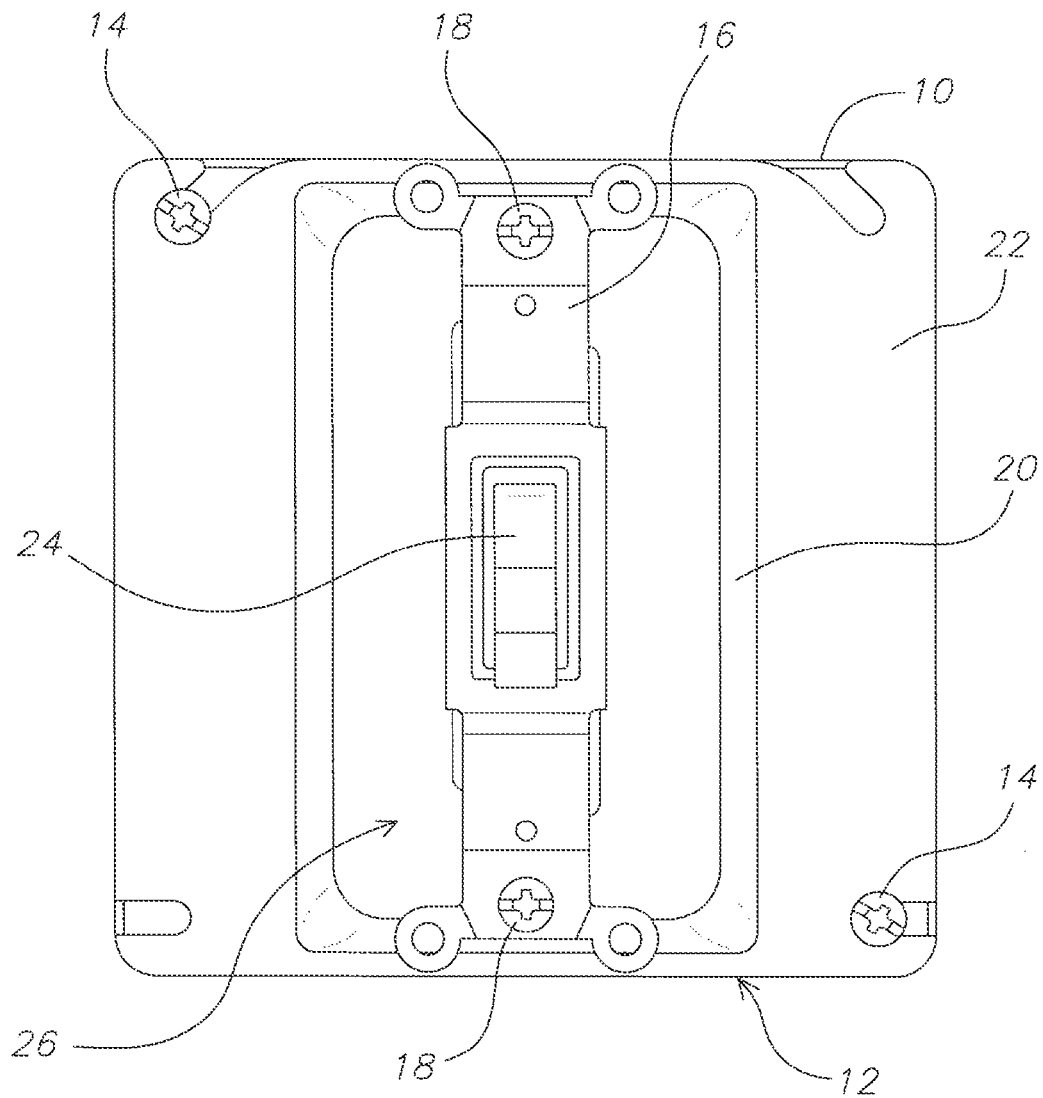
FIG. 1 is a front view of a prior art outlet box with an attached drywall ring and an electrical switch attached thereto.
Figure 2:
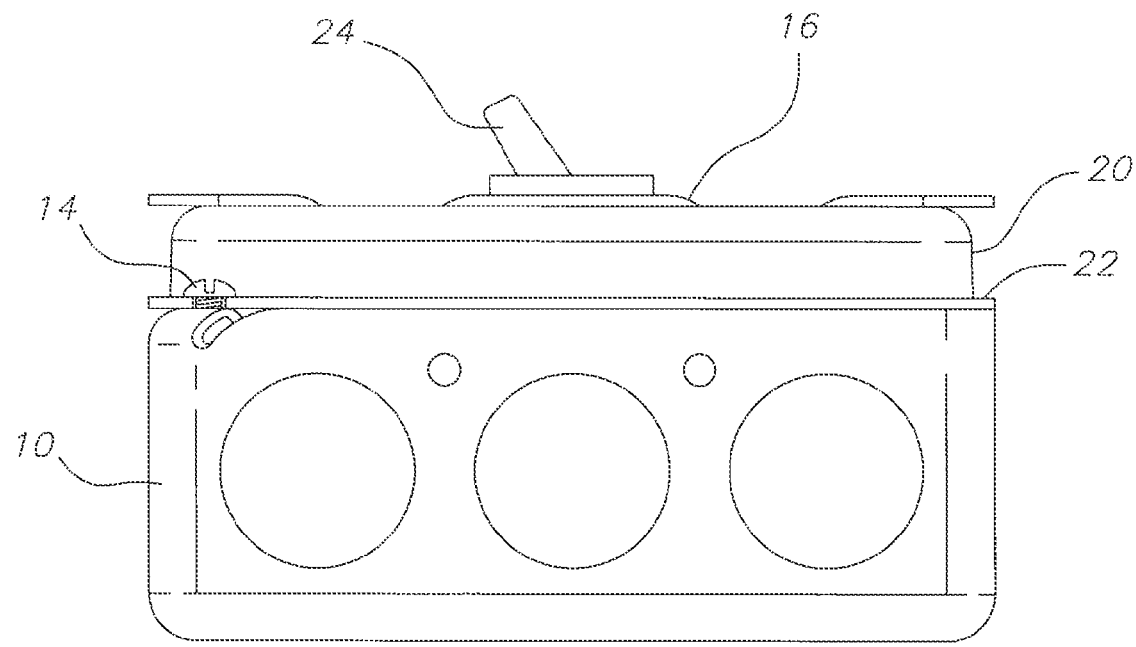
FIG. 2 is a side view of the prior art outlet box with attached drywall ring and electrical switch of FIG. 1.
Figure 3:
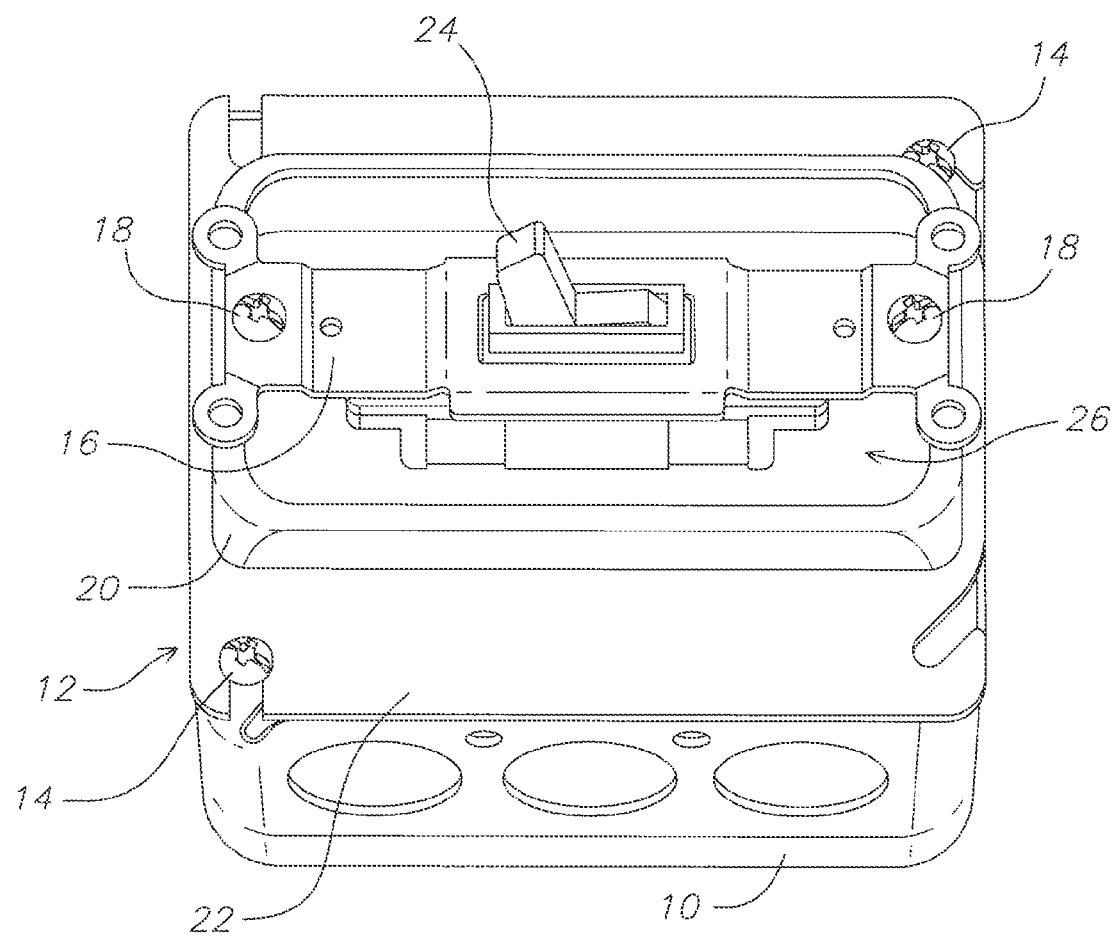
FIG. 3 is a right side perspective view of the prior art outlet box with attached drywall ring and electrical switch of FIG. 1.

FIGS. 1-3 are views of a prior art outlet box 10 a drywall ring 12 attached thereto with screws 14. An electrical device (a switch) 16 in turn is attached to the drywall ring with screws 18. The outlet box 10 is shown as a double gang outlet box that is sized to accommodate two separate devices, but the drywall ring 12 is adapted to hold a single switch 18. The drywall ring 12 has upwardly expending collar 20 which extends outwardly from a base 22. The base 22 is attached to the outlet box 10 with the screws 14. The upwardly project toggle handle 24 of the switch 16 is shown. The upwardly extending collar 20 has an opening 26 into which the electrical device 16 is received.

Figure 4:
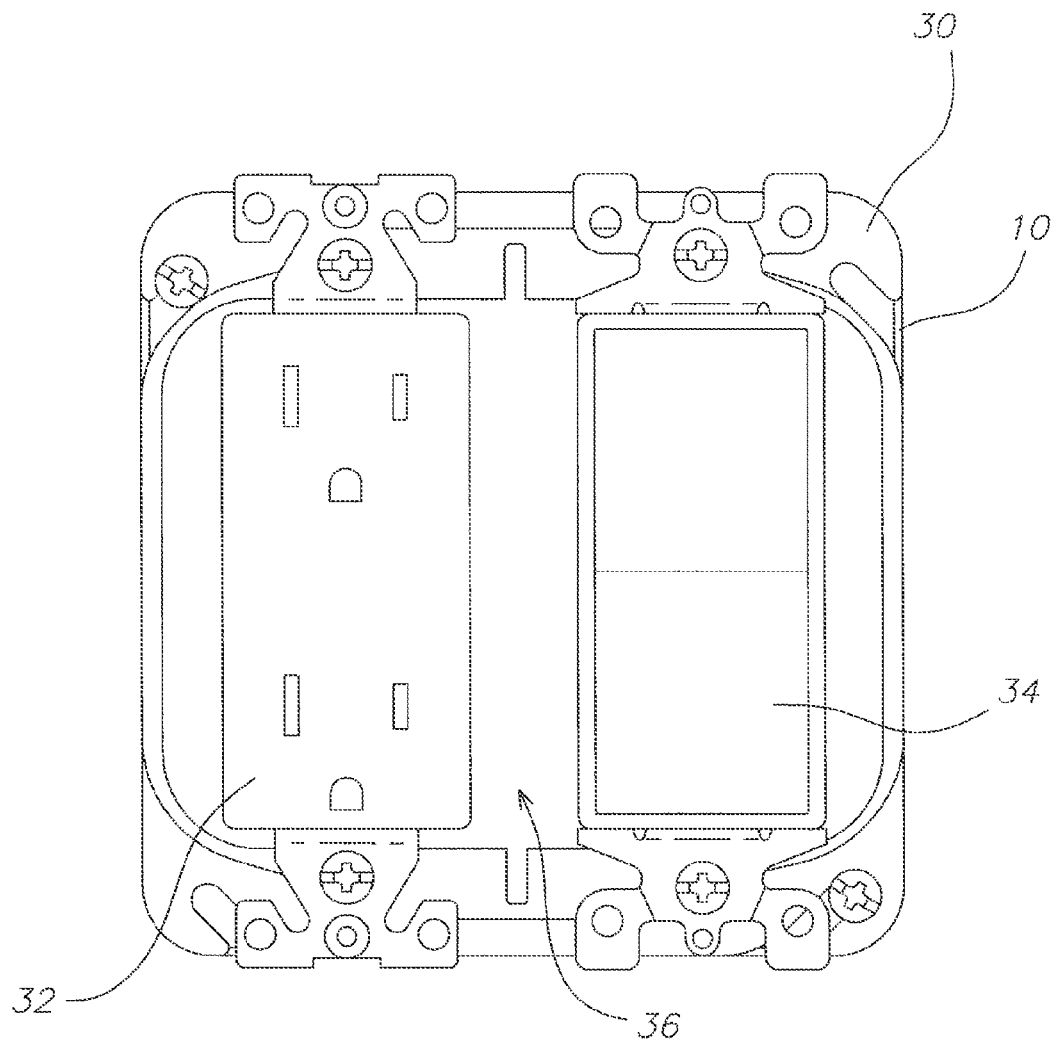
FIG. 4 is a front view of a prior art double gang outlet box with an attached double gang drywall ring with two electrical devices attached thereto.

FIG. 4 is a front view of a prior art double gang outlet box 10 with an attached double gang drywall ring 30 with two electrical devices 32 and 34 attached thereto. The double gang drywall ring 30) has an opening 36 sized to received two electrical devices, such as the outlet 32 and switch 34, as shown, or other devices.

Figure 5:
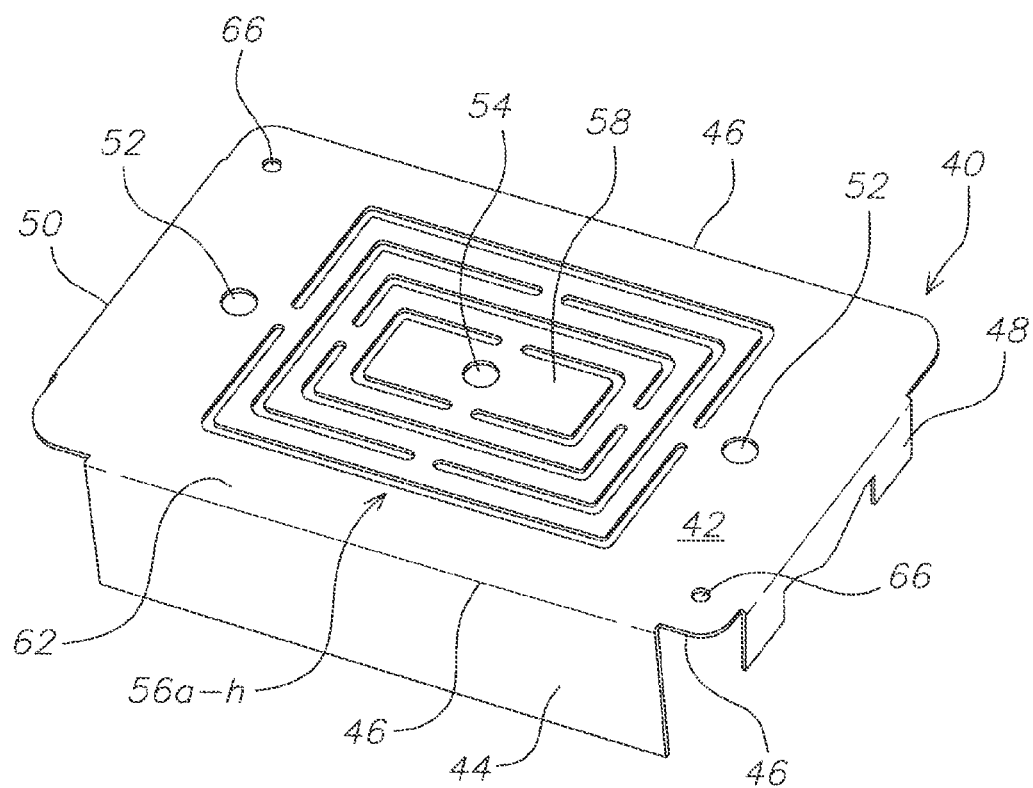
FIG. 5 is a perspective view of an exemplary embodiment of an outlet cover of the invention having discontinuous cut lines to form a telescopable portion.
Figure 6:
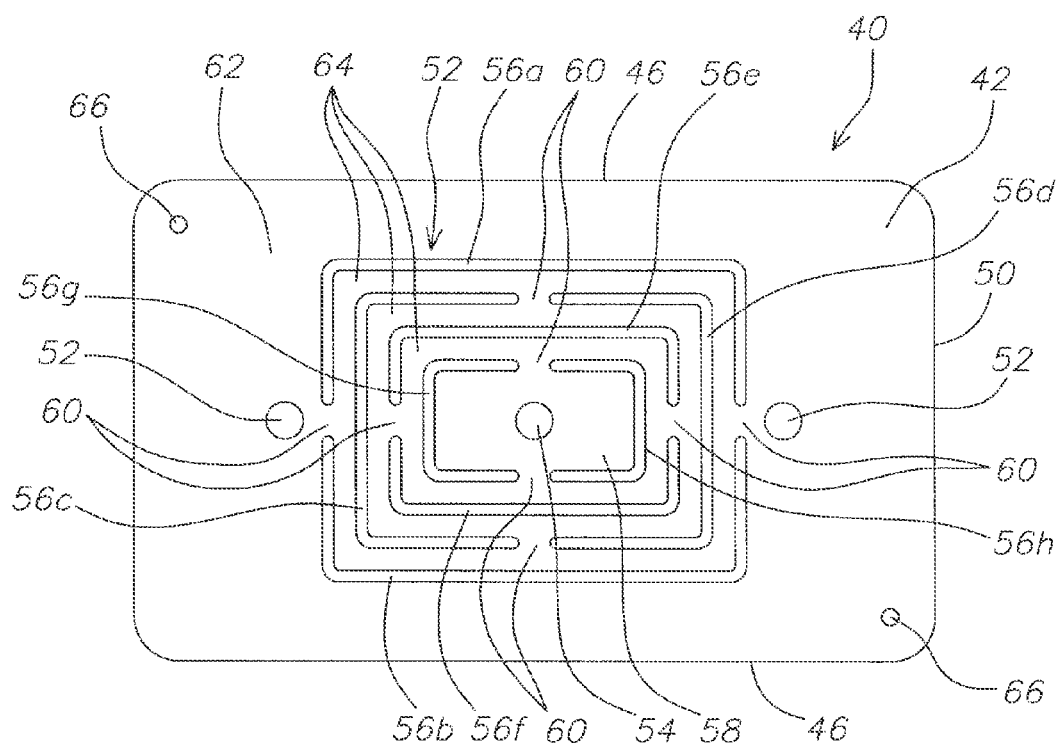
FIG. 6 is a front view of the exemplary outlet cover of FIG. 5.
Figure 7:
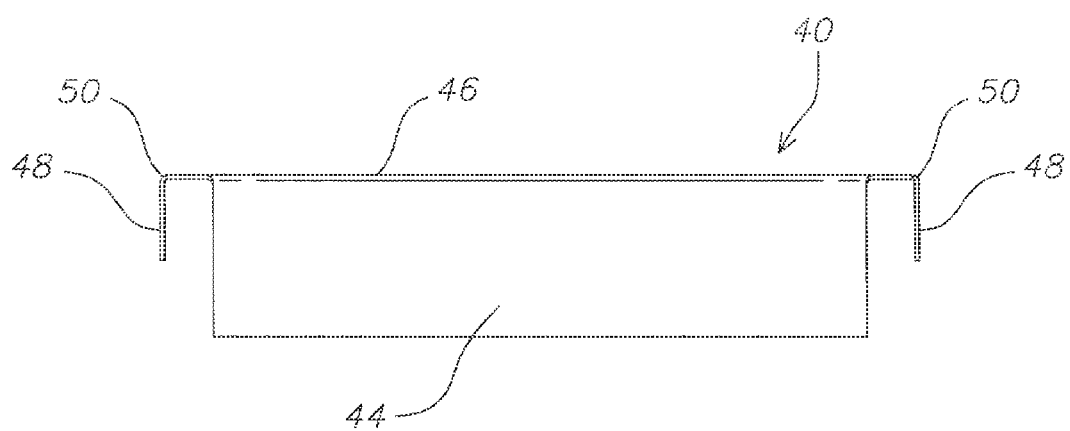
FIG. 7 is a side view of the exemplary outlet cover of FIG. 6.
Figure 10:
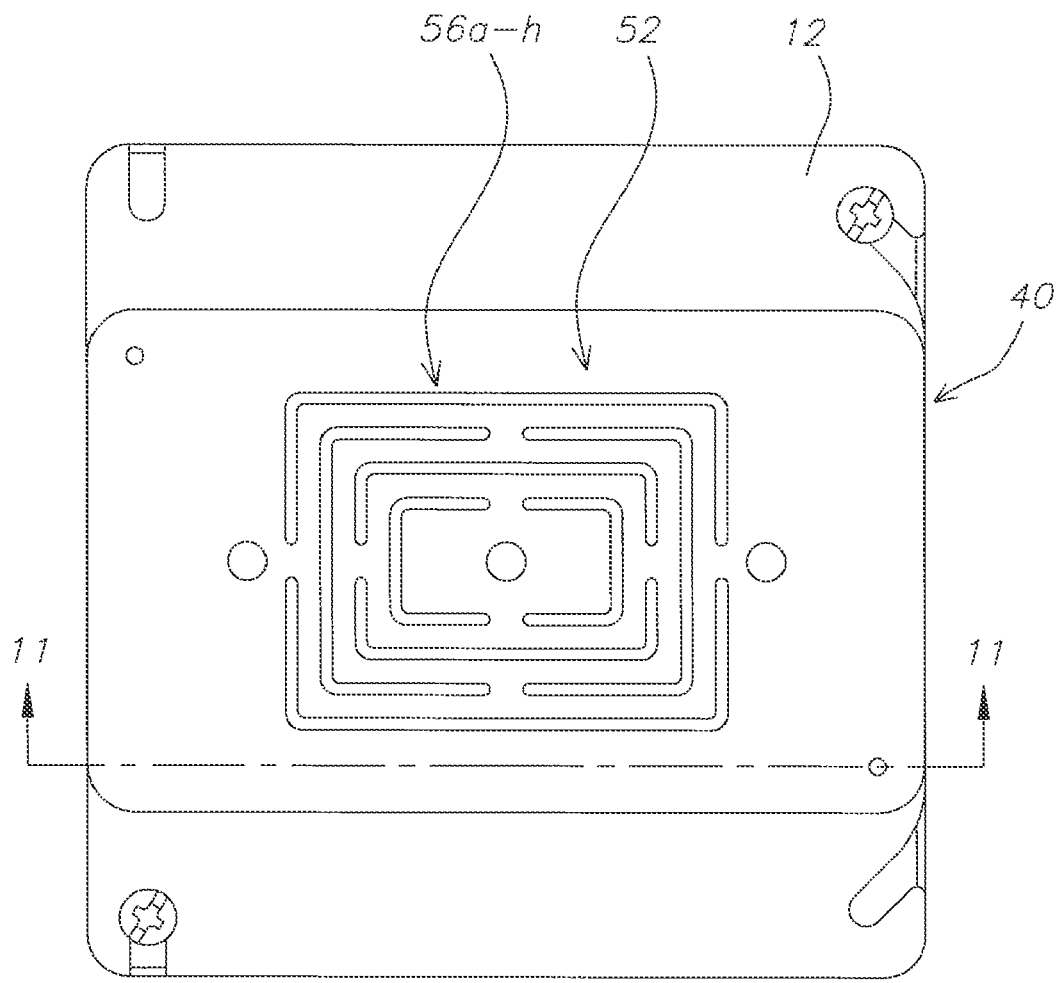
FIG. 10 is a top view of the outlet cover on the outlet box with drywall ring of FIG. 9.
Figure 12:
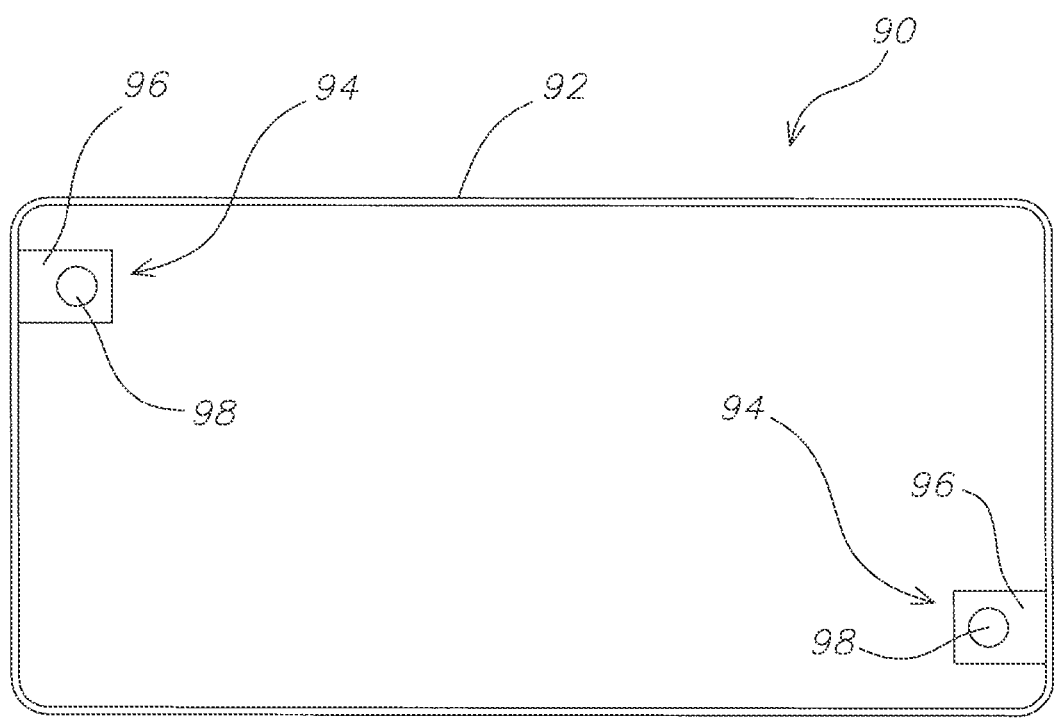
FIG. 12 is a top plan view of an exemplary generally rectangular cutting guide for use with a cover plate.
Figure 13:
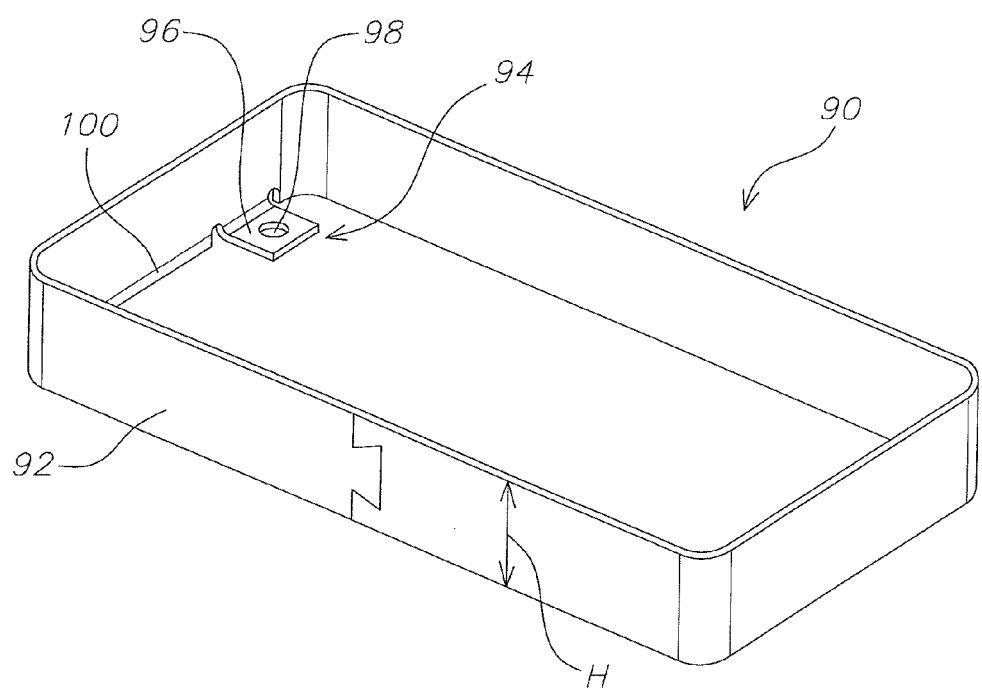
FIG. 13 is an isometric view showing the exemplary cutting guide of FIG. 12.

FIGS. 5, 6 and 7 comprise a perspective, a front, and a side view, respectively, of an exemplary embodiment of an outlet cover 40 of the invention. The exemplary outlet cover 40 is shown as having a generally rectangular front panel 42, with optional side legs 44 that extend downwardly from opposites side edges 46 thereof, and also optionally top and bottom legs 48 that extend from top and bottom edges 50. Other shapes and sizes can be provided. The top and bottom legs 48 will preferably be sized and shaped to clear portions of the electrical device that may protrude beyond an outer perimeter of collar portion of drywall rings. The pairs of legs 44 and 48 can we angled slightly inwardly with respect to each other. Optionally, holes 52 and 54 can be formed in the front panel 42, which holes can be sized and positioned to align with screw holes in standard electrical devices such as switches and outlets and/or can be optionally used to grasp the cover plate with a tool for removal. These holes 52 and/or 54 will then allow screws to be used to detachably retain the outlet cover to one or more electrical devices that is attached to a drywall ring. The front panel 42 also has a discontinuous cut pattern 52. The discontinuous cut pattern 52 comprises a series of progressing cut lines 56a-h (e.g., generally U-shaped cut lines) that are cut through the front panel and leave a central portion 58 that is uncut, the cut lines 56 and central portion 58 forms a first, telescopable portion. The cut lines 56a-h have ends that are separated, leaving uncut tabs 60 between the ends of the cut lines 56a and 56b, 56c and 56d, 56e and 56f, and 56g and 56h. The discontinuous cut pattern 52 lines lie inwardly of an outer, second base area 62. Areas between adjacent cut lines, such as between 56a, and 56c and 56d, form generally U-shaped strips 64 that are available to be pushed outwardly from the front panel 42. The combination of the U-shaped cut lines 54a-h and the uncut tabs 60 that make up the discontinuous cut pattern 52 allow the central portion 58 to be pushed outwardly in a telescoping pattern, as best shown in FIG. 10, to accommodate any portions of the electrical device that may be protruding, such as a toggle handle of a switch. On the other hand, if there are no protruding portions of the electrical device, then no telescoping is needed. Thus, this single cover can be used for a variety of applications. The front panel 42 may optionally have through holes 66 formed therethrough for use in attaching an accessory cutting guide 90, as shown in FIGS. 12 and 13. Depending on the type of screw used, the through holes 66 can be threaded or untapped.

Figure 8:
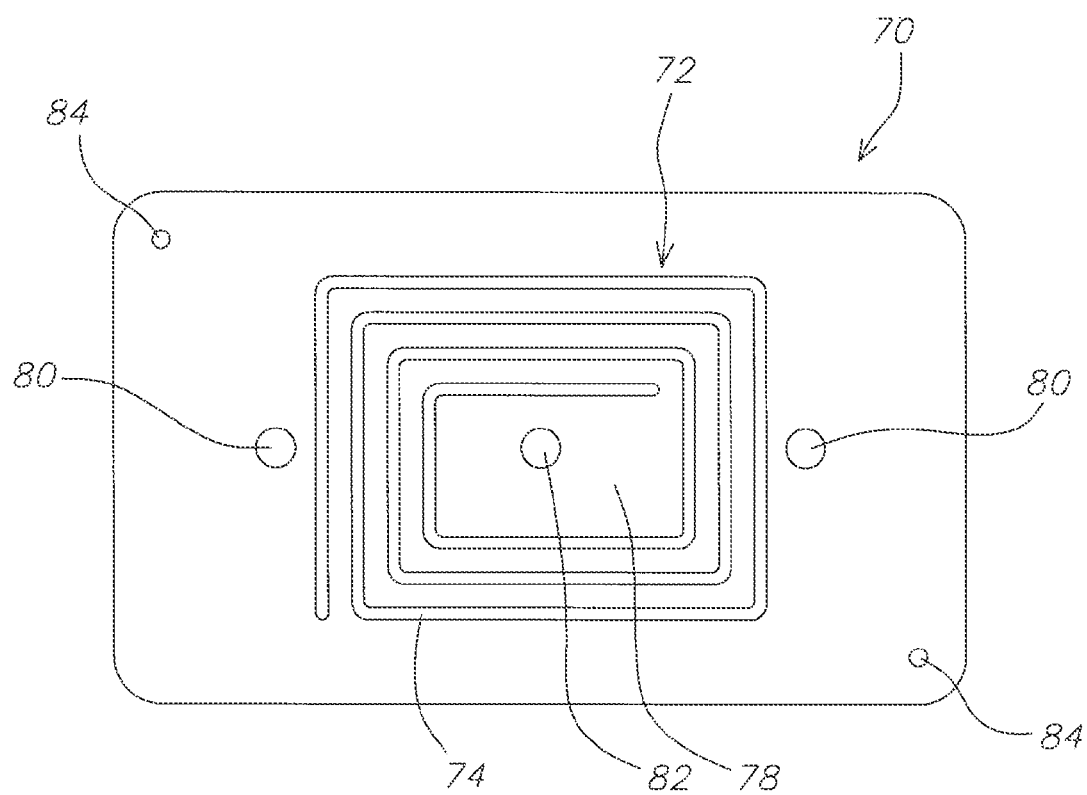
FIG. 8 is a front view of another exemplary outlet cover having a continuous cut line.

FIG. 8 is a front view of another exemplary embodiment of an outlet cover 70 of the invention. In this embodiment, a continuous cut line pattern 72, in the form a generally spiralling cut line 74 is formed on a front panel 76 of the outlet cover 70. At the center of the generally spiral shaped cut line a central portion 78 is formed. This continuous cut line 74 also permits the central portion 78 to be pushed out in a generally telescoping or accordion fashion to accommodate protruding parts of the electrical device. Holes 80 and 82 are optionally formed through the front panel 76 and are available to attach the outlet cover 70 to an electrical device, and/or to grasp the cover plate with a tool for removal. As with the embodiment of the outlet cover 40, one or more pairs of opposite legs can also be included (not shown). The front panel 76 may optionally have through holes 84 formed therethrough for use in attaching an accessory cutting guide 90, as shown in FIGS. 12 and 13. Depending on the type of screw used, the through holes 84 can be threaded or untapped.

Although shown in a single gang form (to cover a single electrical device), the outlet covers 40 and 70 can be made to cover double gang drywall rings as well, in which case two cutout patterns 52/72 will be located on the front panels 42/76. Moreover, for double gang boxes or larger, a plurality of single gang (or double gang) outlet covers can be used side-by-side to cover the electrical devices. Although particular cut line patterns are shown, the invention is not limited to particular cut line patterns. Also, in order to provide for better sealing from possible instruction of dust, pain, etc., a sealing means, such as a section of plastic sheet material, can optionally be provided.

Figure 9:
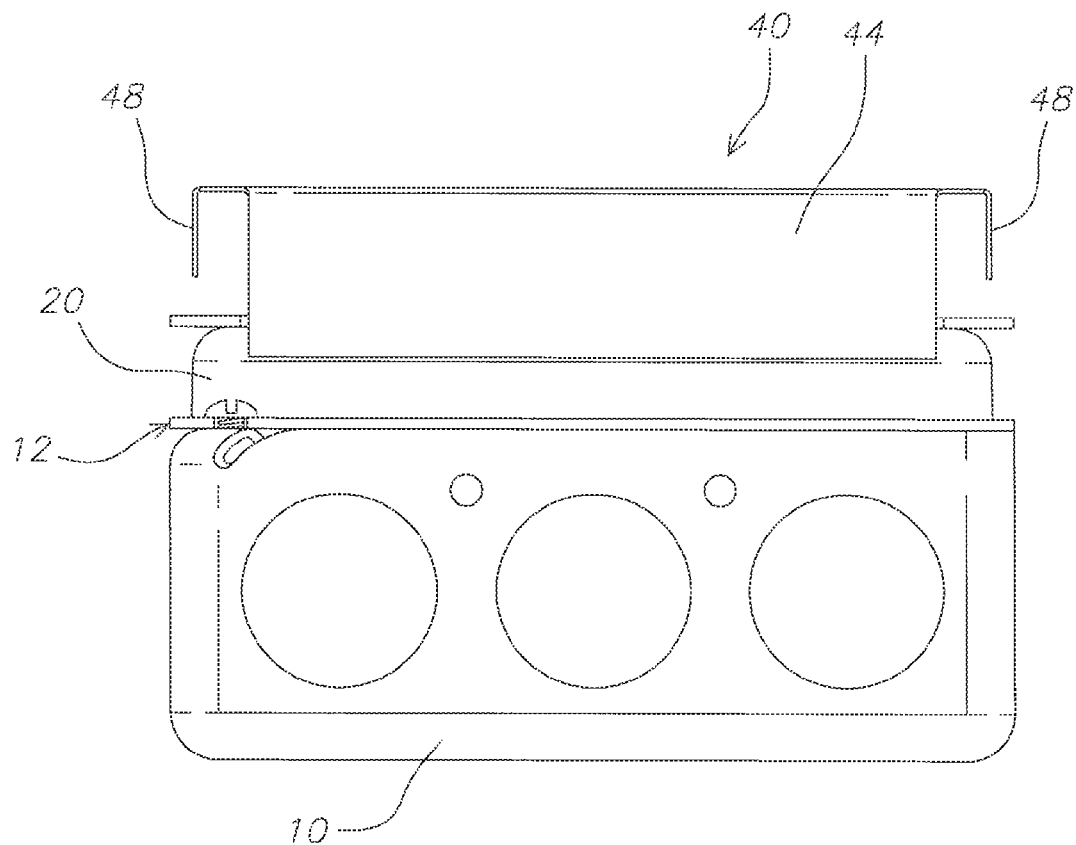
FIG. 9 is a side view of the outlet cover of FIG. 6 as it is being placed on the drywall ring and outlet box of FIGS. 1-3.

FIG. 9 is a side view and FIG. 10 is a top view of the outlet cover 40 of FIG. 6 as it is being placed on the drywall ring 12 and outlet box 10 of FIGS. 1-3. As the outlet cover 40 is pushed down, the legs 44 and 48 will make contact with the upwardly expending collar 20 and clamp thereon. As can be seen the open front of the drywall ring and the attached electrical device will be covered and protected by the outlet cover 40. If there is an electrical device with a protruding part, the telescopable portion can be moved forwardly.

Figure 11:
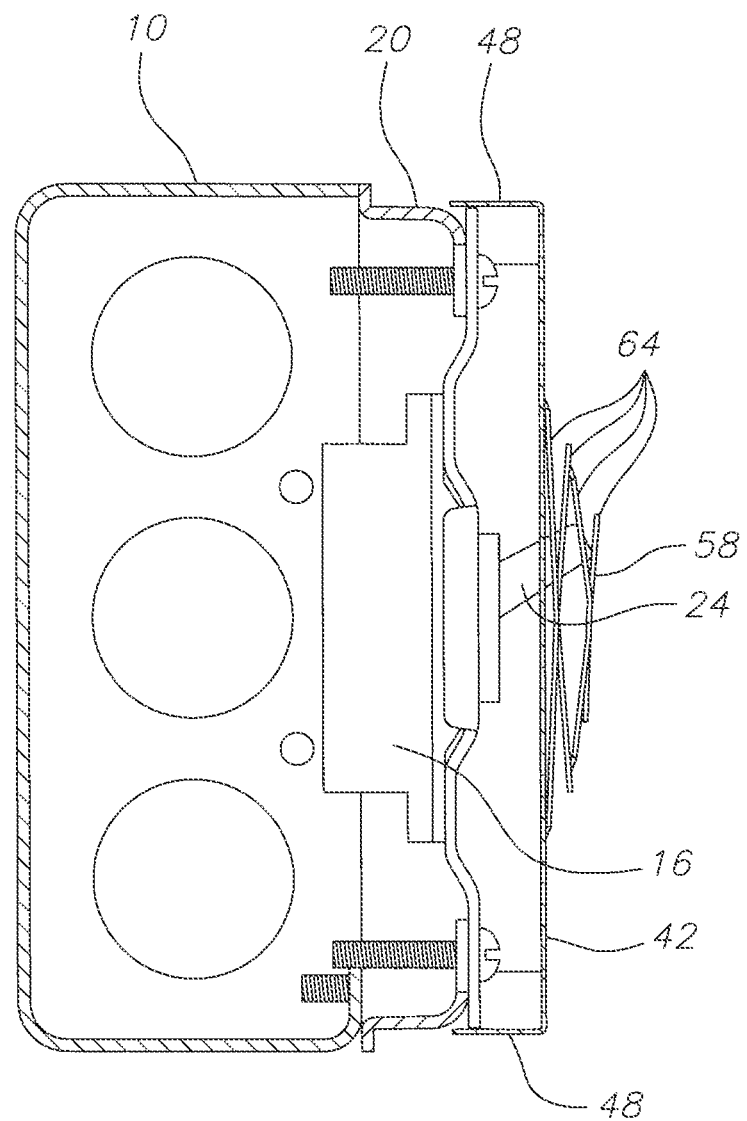
FIG. 11 is a cross-sectional view through view lines 11-11 of FIG. 10 showing how the central portion of the outlet cover of FIG. 6 is telescoped out to fit over a switch handle of an electrical device.

FIG. 11 is a cross-sectional view through view lines 11-11 of FIG. 10 showing how the central portion 58 and the strips 64 of the telescopable area are telescoped outwardly to fit over the switch handle 24 of the electrical device 16. The legs 48 are shown contacting the upwardly extending collar 20 of the drywall ring 12 on the outlet box 10.

FIG. 12 is a top plan view and FIG. 13 is an isometric view showing a generally rectangular exemplary cutting guide 90 of the invention for use with a cover plate, whether it has cut lines as shown in the exemplary embodiments of FIGS. 5 and 6 or 8, other cut line patterns, or does not have cut lines. The cutting guide 90 has an upwardly extending generally vertical perimeter wall 92 of height "H", and has at least one and preferably more than one attachment devices 94 for use in attaching the cutting guide 90 to a device cover. The height H of the perimeter wall 92 is sufficiently high so that a cutting device, such as a router blade, used to cut around the perimeter wall 92, e.g., around an outside edge thereof, may be extended below a lower wall surface of the material to be cut (e.g., drywall, concrete board, tile board, etc.). For example, about 1.27 cm (0.5 inches) is sufficient for most router blades. The cutting guide 90 is sized and shaped to have a desired perimeter. For example, the cutting guide 90 will preferably have a size and shape that extends to a perimeter edge of the outlet cover 40/70 so that once the sheet material is cut around the outside perimeter edge of the cutting guide 90, the outlet cover and its attached cutting guide can be easily removed without damaging the sheet material. Each of the attachment devices 94 shown can comprise a tab 96 with a through hole 98 formed therein, which through holes 98 are made to line up with complementary holes, e.g., 66 and 84 in covers 40 and 70 of FIGS. 6 and 8, respectively. In lieu of through holes, other devices, such as clips, adhesives, rivets, spot welding, etc., can be used to connect the cutting guide to the device cover. If desired, the cutting guide 90 may also include a lower rim portion 100 that can be generally perpendicular to the perimeter wall 92, the lower rim portion 100 being useful to seat on the cover plate (not shown). In lieu of having a separate cutting guide 90 and cover plate, the cover plate and cutting guide can be formed integrally if desired.

Figure 14:
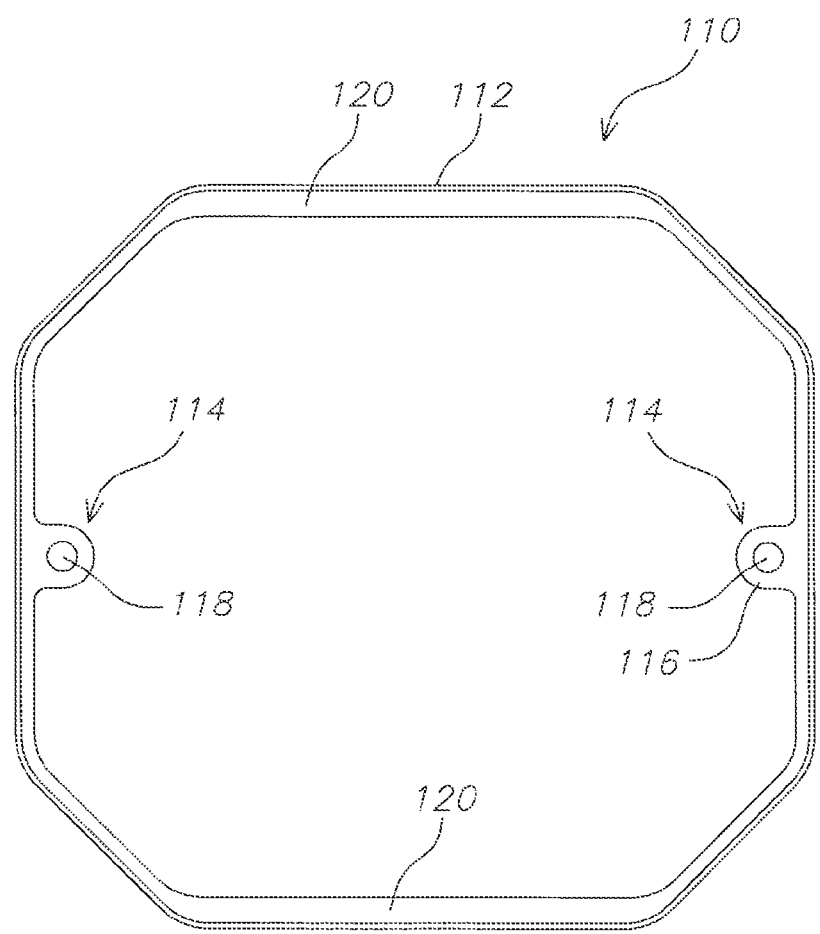
FIG. 14 is a top plan view showing another embodiment of an exemplary generally octagonal cutting guide for use with an outlet cover.
Figure 15:
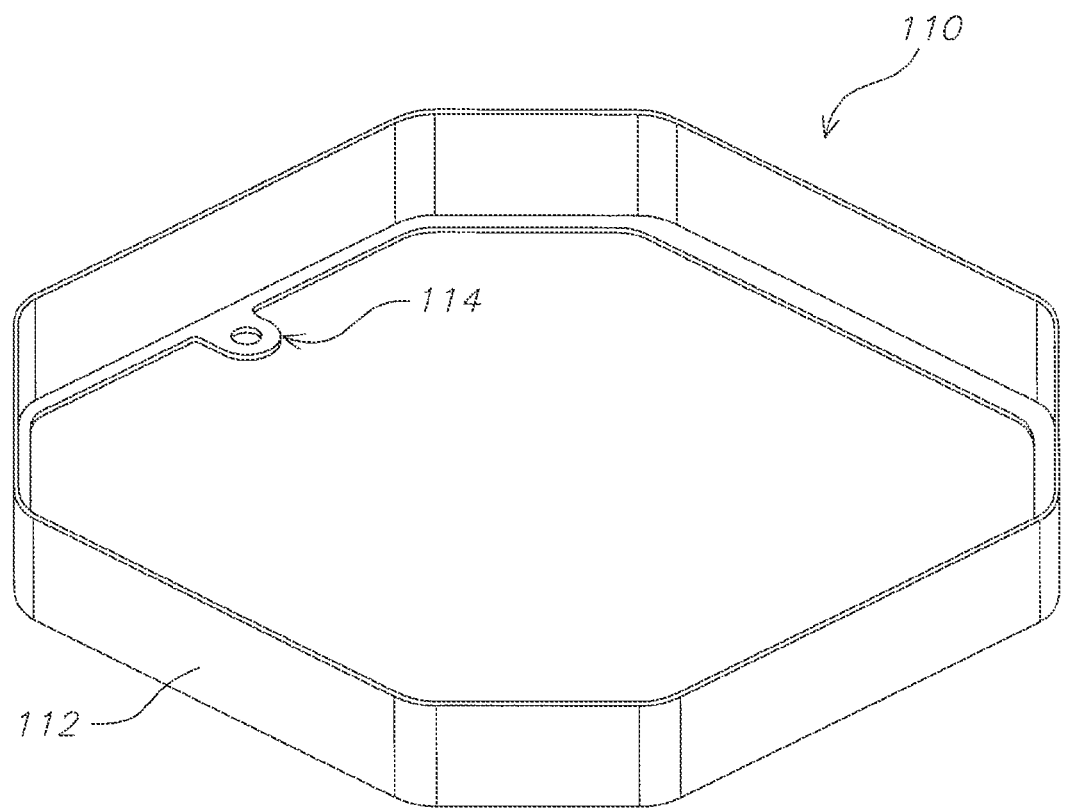
FIG. 15 is an isometric view showing the exemplary cutting guide of FIG. 14.

FIG. 14 is a top plan view showing another embodiment of a generally octagonal exemplary cutting guide 110 for use with a cover plate and FIG. 15 is an isometric view showing the exemplary cutting guide 110 of FIG. 14. The cutting guide 110 has an upwardly extending generally vertical perimeter wall 112 of height "H", and has at least one and preferably more than one attachment devices 114 for use in attaching the cutting guide 110 to a device cover. The height H of the perimeter wall 112 is sufficiently high so that a cutting device such as a router blade used to cut around the perimeter wall 112, e.g., around an outside edge thereof, may be extended below a lower wall surface of the material to be cut (e.g., drywall, concrete board, tile board, etc.). For example, about 1.25 cm (0.5 inches) is sufficient for most router blades. The cutting guide 110 is sized and shaped to have a desired perimeter. For example, the cutting guide will preferably have a size and shape that extends to a perimeter edge of the outlet cover 40/70 so that once the wall sheet material is cut around the outside perimeter edge of the cutting guide 90, the outlet cover and its attached cutting guide can be easily removed without damaging the wall covering material. Each of the attachment devices 114 shown can comprise a tab 116 with a through hole 118 formed therein, which through holes 118 are made to line up with complementary holes, e.g., 66 and 84 in covers 40 and 70 of FIGS. 6 and 8, respectively. In lieu of through holes, other devices, such as clips, adhesives, rivets, spot welding, etc., can be used to connect the cutting guide to the device cover. The cutting guide 110 may optionally include a lower rim portion 120 that can be generally perpendicular to the perimeter wall 112, the lower rim portion 120 being useful to seat on the cover plate (not shown). In lieu of having a separate cutting guide 110 and cover plate, the cover plate and cutting guide can be formed integrally if desired.

Figure 16:
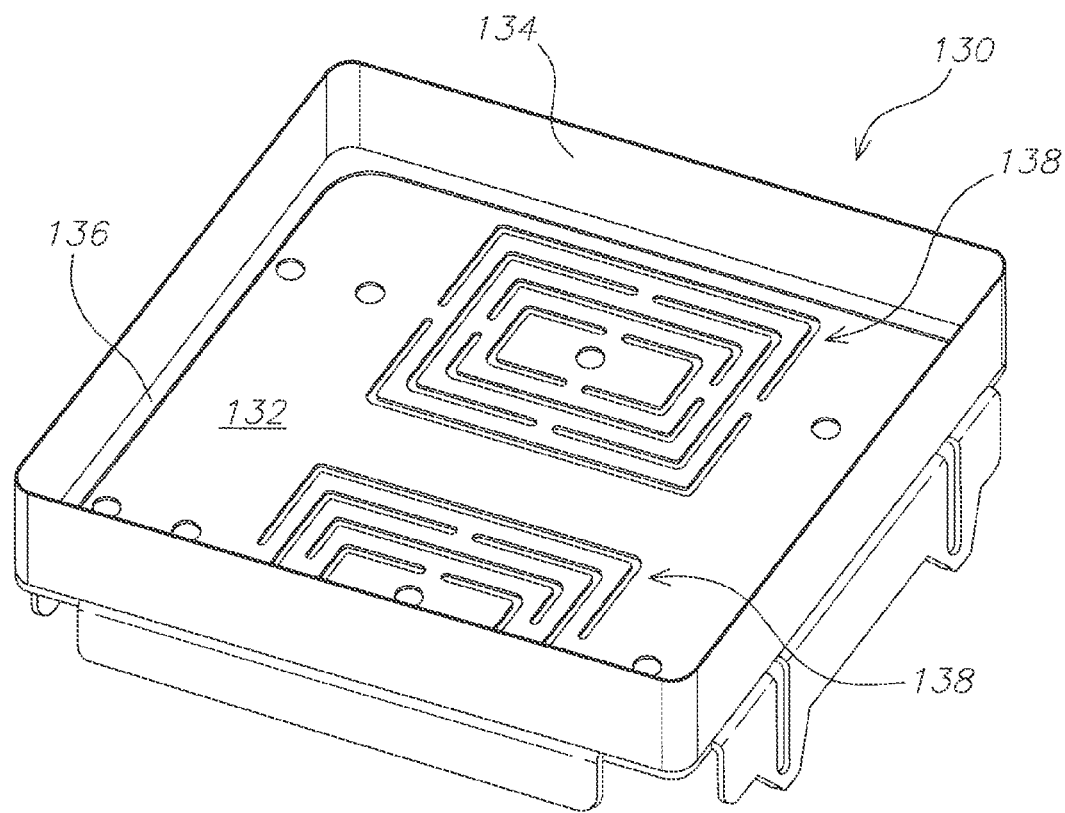
FIG. 16 is an isometric view showing an exemplary cutting guide attached to an outlet cover for a duplex outlet box.

FIG. 16 is an isometric view showing an exemplary cutting guide 130 attached to an outlet cover 132 for a duplex outlet box. The exemplary cutting guide 130 has an upwardly extending generally vertical perimeter wall 134 and a lower rim portion 136 that is generally perpendicular to the perimeter wall 134. The cutting guide 130 is attached to the outlet cover 132 at its lower rim portion 136, e.g. by spot welding, but could also be detachably attached thereto. The outlet cover 132 is shown having a cutout pattern 138 with two separate cutout regions to accommodate two devices (e.g. two switches) in an outlet box. In lieu of having a separate cutting guide 110 and cover plate, the cover plate 132 and cutting guide 130 can be formed integrally if desired. Also, if telescopability if not needed, the cutout pattern can be foregone with.

The invention also discloses a method for protecting an electrical device in an electrical device outlet during installation of sheet material around the outlet using an electrical device outlet cover as described above. The outlet cover is attached to an outlet box or an opening in an outlet box drywall ring. Thereafter, sheet material, such as wallboard, drywall, cement board, or other similar materials is applied to cover the wall, (or floor or ceiling) that has the outlet therein. A sheet material will then use a tool, e.g., a router, to cut around the electrical device outlet cover to create a cutout or opening in the sheet material. The cutout or opening will be sized so that the cover can be removed therethrough without disturbing the sheet material around the outlet box or drywall ring attached thereto. In embodiments where the device cover includes a cutting guide, the user will used the cutting guide to guide the cutting tool to accurately form the cutout or opening, e.g., around an outer perimeter of the cutting guide. To aid in the removal of the outlet cover, the optional cover plate removal aperture formed through the front plate can be engaged with a tool, such as needle nose pliers.

The outlet cover will preferably come as part of the pre-wired outlet system having a pre-wired conduit box with wiring and fixtures located therein and with mounting means, with the outlet cover fitted over the outlet box and will not only serve to protect the wiring and outlet and/or switches, during wall sheet installation, painting, wallpapering, other wall treatments, but also during storage and transportation of the pre-wired boxes, and the like.

Although apertures 30 and 54 shown in the faces of the covers are shown as circular holes, other shapes can be utilized such as long slot shaped apertures, rectangular holes and other shapes. Furthermore, although a plurality of apertures is shown, a single aperture could also be provided. The outlet covers are preferably made from a single piece of sheet steel bent to shape, but could also be made from multiple pieces of material permanently fixed (e.g. by spot welding) together. Although the term "cut line" is used throughout this application to describe these linear openings, the cut lines need not be formed by cutting.

Although preferred embodiments of the present invention have been described, it should not be construed to limit the scope of the invention. In addition, those skilled in the art will understand that various modifications may be made to the described embodiments. Moreover, to those skilled in the various arts, the invention itself herein will suggest solutions to other tasks and adaptations for other applications. It is therefore desired that the present embodiments be considered in all respects as illustrated and not restrictive.

What is claimed is:

1. An electrical device outlet cover for use in covering an opening in an outlet box or an opening in an outlet box drywall ring and any electrical device contained within the outlet box and/or which extends outwardly from the outlet box and/or the outlet box drywall ring, comprising:

a rigid front plate having a cut line formed through the front plate to define a first, telescopable portion of the front plate, the cut line allowing the first, telescopable portion of the front plate to be telescoped outwardly and projected upwardly from a second, stationary portion of the front plate to thereby cover and protect any electrical device contained within the outlet box which extends outwardly from the outlet box and/or the outlet box drywall ring.

2. The electrical device outlet cover of claim 1, wherein the front plate further comprises an attachment for attaching the front plate to the outlet box, outlet box drywall ring or electrical device attached thereto.

3. The electrical device outlet cover of claim 2, wherein the attachment comprises openings formed in the front plate for passage of a detachable attachment.

4. The electrical device outlet cover of claim 2, wherein the attachment comprises legs that extend downwardly from the front plate.

5. The electrical device outlet cover of claim 1, further comprising a cover plate removal aperture formed through the front plate.

6. The electrical device outlet cover of claim 1, wherein the outlet cover is made from material selected from the group consisting of metal and plastic.

7. The electrical device outlet cover of claim 1, further comprising a cutting guide, which cutting guide comprises a wall that extends generally perpendicularly upwardly from the front plate and follows a path that generally corresponds to a shape of an outlet box or a drywall ring to which the device outlet cover is to be attached.

8. The electrical device outlet cover of claim 7, wherein the cutting guide is detachably attached to the front plate.

9. The electrical device outlet cover of claim 7, wherein the cutting guide is permanently attached to the front plate.

10. The electrical device outlet cover of claim 7, wherein the cutting guide is integrally formed with the front plate.

11. A method for protecting an electrical device in an electrical device outlet box during installation of sheet material around the outlet box or an outlet box drywall ring using the electrical device outlet cover of claim 1, comprising:
    attaching an electrical device outlet cover of claim 1 over an opening in an outlet box or an opening in an outlet box drywall ring;
    cutting an opening in sheet material in front of the outlet box or an outlet box drywall ring attached to the outlet box; and
    removing the electrical device outlet cover through the opening formed in the sheet material.

12. An electrical device outlet cover for use in covering an opening in an outlet box or an opening in an outlet box drywall ring, comprising:
    a front plate having a cut line formed through the front plate to define a first, telescopable portion of the front plate, the cut line allowing the first, telescopable portion of the front plate to be telescoped outwardly from a second, stationary portion of the front plate, wherein the cut line comprises a plurality of cut lines that are formed within the first, telescopable portion of the front plate, each cut line being formed along a generally U-shaped path with two terminating ends, wherein two generally mirror image cut lines are arranged with uncut areas between their terminating ends to form a pair of cut lines that follow a generally rectangular path, wherein a plurality of pairs of cut lines are formed generally concentrically in the first, telescopable portion of the front plate, with pairs of generally U-shaped cut lines being rotated with respect to adjacent pairs of cut line.

13. An electrical device outlet cover for use in covering an opening in an outlet box or an opening in an outlet box drywall ring, comprising:
    a front plate having a cut line formed through the front plate to define a first, telescopable portion of the front plate, the cut line allowing the first, telescopable portion of the front plate to be telescoped outwardly from a second, stationary portion of the front plate, wherein the cut line is formed in the first, telescopable portion of the front plate in a generally spiraling orientation, forming an inner-most portion of the telescopable portion and regions of the telescopable portion bordered by adjacent portions of the generally spiraling cut line that are adapted to be telescoped from the second, stationary portion of the front plate.

14. An electrical device outlet cover for use in covering an opening in an outlet box or an opening in an outlet box drywall ring and any electrical device contained within the outlet box and/or which extends outwardly from the outlet box and/or the outlet box drywall ring and for permitting a cutout in sheet material attached in front of the outlet box to be accurately made, comprising:
    a front plate that covers and protects any electrical device contained within the outlet box and/or which extends outwardly from the outlet box and/or the outlet box drywall ring, wherein the front plate has a cut line formed through a first, telescopable portion of the front plate, the cut line allowing the first, telescopable portion of the front plate to be telescoped outwardly from a second, stationary portion of the front plate; and
    a cutting guide, which cutting guide comprises a wall that extends generally perpendicularly outwardly from the front plate and above the outlet box or drywall ring and follows a path that generally corresponds to a shape of an outlet box or a drywall ring to which the device outlet cover is to be attached.

15. The electrical device outlet cover of claim 14, wherein the cutting guide is permanently attached to the front plate.

16. The electrical device outlet cover of claim 14, wherein the cutting guide is integrally formed with the front plate.

17. The electrical device outlet cover of claim 14, wherein the front plate further comprises an attachment for attaching the front plate to the outlet box, outlet box drywall ring or electrical device attached thereto.

18. The electrical device outlet cover of claim 17, wherein the attachment comprises openings formed in the front plate for passage of a detachable attachment.

19. The electrical device outlet cover of claim 17, wherein the attachment comprises legs that extend downwardly from the front plate.

20. A method for protecting an electrical device in an electrical device outlet during installation of sheet material around the outlet using the electrical device outlet cover of claim 14, comprising:
    attaching the electrical device outlet cover of claim 14 over an opening in an outlet box or an opening in an outlet box drywall ring;
    cutting an opening in the sheet material by using the cutting guide to guide a cutting device; and
    removing the electrical device outlet cover through the opening formed in the sheet material.

* * * * *